(12) United States Patent
Nadkarni et al.

(10) Patent No.: US 12,486,041 B2
(45) Date of Patent: Dec. 2, 2025

(54) COMPUTATION OF AIRCRAFT AIRSPEED BY INCLUSION OF STATIC AIR TEMPERATURE

(71) Applicant: The Boeing Company, Chicago, IL (US)

(72) Inventors: Arun Anant Nadkarni, Kirkland, WA (US); Douglas L. Wilson, Mercer Island, WA (US)

(73) Assignee: THE BOEING COMPANY, Arlington, VA (US)

( * ) Notice: Subject to any disclaimer, the term of this patent is extended or adjusted under 35 U.S.C. 154(b) by 763 days.

(21) Appl. No.: 17/536,893

(22) Filed: Nov. 29, 2021

(65) Prior Publication Data

US 2022/0355948 A1 Nov. 10, 2022

Related U.S. Application Data

(60) Provisional application No. 63/183,883, filed on May 4, 2021.

(51) Int. Cl.
*B64D 43/02* (2006.01)
*G01K 13/02* (2021.01)
(Continued)

(52) U.S. Cl.
CPC ........... *B64D 43/02* (2013.01); *G01K 13/028* (2013.01); *G01P 5/10* (2013.01); *G01P 5/175* (2013.01); *G01P 13/025* (2013.01)

(58) Field of Classification Search
CPC ...... B64D 43/02; G01K 13/028; G01K 13/08; G01K 1/14; G01K 7/02; G01P 5/10;
(Continued)

(56) References Cited

U.S. PATENT DOCUMENTS 2,528,518 A * 11/1950 Huber ....................... G01P 1/08
235/84
2,852,213 A * 9/1958 Lambert ................ B64D 13/04
244/59
(Continued)

FOREIGN PATENT DOCUMENTS

AU 2003302319 A1 * 3/2005 ............. B64D 15/20
CA 2314751 C * 11/2003 ................ F02C 9/28
(Continued)

OTHER PUBLICATIONS

17536893_2024-08-05_CA_2643641_A1_H.pdf,Jun. 18, 2009.*
(Continued)

*Primary Examiner* — Peter J Macchiarolo
*Assistant Examiner* — Janice M Soto
(74) *Attorney, Agent, or Firm* — Moore IP Law

(57) ABSTRACT

A system may include a static air temperature probe attached to an aircraft, an electronic flight instrument system, and a processor. The processor may be configured to measure a static air temperature at the aircraft using the static air temperature probe. The processor may further be configured to calculate a Mach number associated with the aircraft based at least partially on the static air temperature. The processor may also be configured to calculate a true air speed of the aircraft based on the Mach number. The processor may display an indication of the true air speed using the electronic flight instrument system. The processor may also be configured to calculate the speed of sound based at least partially on the static air temperature.

20 Claims, 3 Drawing Sheets

(51) Int. Cl.
*G01P 5/10* (2006.01)
*G01P 5/175* (2006.01)
*G01P 13/02* (2006.01)

(58) Field of Classification Search
CPC .... G01P 5/175; G01P 13/025; H01J 37/3005; H01J 37/3178; H01J 2237/2001; H01J 2237/20214; C23C 14/505; C23C 14/243; C23C 14/54; C23C 14/30; G01N 25/00
See application file for complete search history.

(56) References Cited

U.S. PATENT DOCUMENTS

| | | | | | |
|---|---|---|---|---|---|
| 2,950,958 | A | * | 8/1960 | Nesh | G01N 31/222 436/178 |
| 2,959,958 | A | * | 11/1960 | Savet | G01W 1/04 374/135 |
| 3,257,849 | A | * | 6/1966 | Angus | G01L 7/104 73/182 |
| 3,548,654 | A | * | 12/1970 | Cole, Jr. | G01P 5/07 73/170.08 |
| 3,635,398 | A | * | 1/1972 | Toni | G06G 1/14 235/61 NV |
| 4,581,999 | A | * | 4/1986 | Campagnuolo | F42C 21/00 73/167 |
| 4,723,214 | A | * | 2/1988 | Frei | B64C 13/16 701/4 |
| 4,785,403 | A | * | 11/1988 | Kuhlberg | F02C 9/28 714/48 |
| 5,004,187 | A | * | 4/1991 | Falempin | B64D 33/02 244/53 B |
| 5,025,661 | A | * | 6/1991 | McCormack | G01L 19/0092 73/180 |
| 5,161,365 | A | * | 11/1992 | Wright | F02C 7/16 60/39.461 |
| 6,937,937 | B1 | * | 8/2005 | Manfred | G01W 1/10 340/971 |
| 7,031,871 | B2 | | 4/2006 | Severson | G01K 13/02 374/E13.006 |
| 7,334,467 | B1 | * | 2/2008 | DuPuis | G01P 5/165 73/180 |
| 7,490,510 | B2 | * | 2/2009 | Agami | G01P 5/14 73/182 |
| 2018/0088147 | A1 | * | 3/2018 | Askarpour | G06F 17/18 |

FOREIGN PATENT DOCUMENTS

| | | | | | |
|---|---|---|---|---|---|
| CA | 2643641 | A1 | * | 6/2009 | G01K 13/02 |
| CA | 3034728 | A1 | * | 11/2019 | B64D 43/02 |
| CA | 3064935 | A1 | * | 1/2021 | G01C 23/00 |
| CN | 103970979 | A | * | 8/2014 | |
| CN | 202281840 | U | * | 6/2016 | |
| EP | 1256811 | A2 | * | 11/2002 | B64D 43/02 |
| EP | 1602905 | A1 | | 12/2005 | |
| EP | 3415922 | A1 | | 12/2018 | |
| EP | 3739343 | A1 | | 11/2020 | |
| FR | 2988833 | A1 | * | 10/2013 | B64D 43/00 |
| FR | 2988836 | A1 | * | 10/2013 | G01G 19/07 |
| JP | 2010217077 | A | * | 9/2010 | |
| JP | 2014502836 | A5 | * | 10/2014 | |
| JP | 2019023067 | A | * | 2/2019 | B64C 23/00 |
| WO | WO-9205414 | A1 | * | 4/1992 | |
| WO | WO-2005020175 | A1 | * | 3/2005 | B64D 15/20 |
| WO | WO-2014084973 | A1 | * | 6/2014 | G01P 5/26 |
| WO | WO2015008308 | A2 | | 1/2015 | |
| WO | WO-2016027184 | A1 | * | 2/2016 | G05D 23/1927 |
| WO | WO-2018137004 | A2 | * | 8/2018 | B64D 43/02 |

OTHER PUBLICATIONS

17536893_2024-08-05_CA_3064935_A1_H.pdf,Jan. 26, 2021.*
17536893_2024-08-05_CN_103970979_A_H.pdf,Aug. 6, 2014.*
17536893_2024-08-05_FR_2988833_A1_H.pdf,Oct. 4, 2013.*
17536893_2024-08-05_FR_2988836_A1_H.pdf,Oct. 4, 2013.*
17536893_2024-08-05_JP_2010217077_A_H.pdf,Sep. 30, 2010.*
17536893_2024-08-05_JP_2019023067_A_H.pdf,Feb. 14, 2019.*
17536893_2024-08-05_WO_2005020175_A1_H.pdfMar. 3, 2005.*
17536893_2024-08-05_WO_2014084973_A1_H.pdf,Jun. 5, 2014.*
17536893_2024-08-05_WO_2016027184_A1_H.pdf,Feb. 25, 2016.*
17536893_2024-08-05_WO_2018137004_A2_H.pdf,Aug. 2, 2018.*
17536893_2024-08-06_CN_202281840_U_H.pdf,Jun. 20, 2012.*
17536893_2024-10-29_WO_2005020175_A1_H.pdf,Mar. 3, 2005.*
17536893_2024-11-21_CA_2314751_C_H.pdf,Nov. 18, 2003.*
17536893_2024-11-21_CA_3034728_A1_H.pdf,Nov. 9, 2019.*
17536893_2024-11-21_EP_1256811_A2_H.pdf,Nov. 13, 2002.*
17536893_2024-11-21_JP_2014502836_A5_H.pdf,Oct. 16, 2014.*
17536893_2024-11-22_WO_9205414_A1_H.pdf,Apr. 2, 1992.*
7536893_2025-02-04_FR_2950437_A1_H.pdf,Mar. 25, 2011.*
17536893_2025-02-04_AU_2003302319_A1_H.pdf,Mar. 10, 2005.*
"Air density, Speed, and Temperature", Basic Air Data, 2011. (Year: 2011).*
Olson, Wayne M. "Airspeed." Aircraft Performance Flight Testing, 2000, p. 30-39. (Year: 2000).*
European Patent Office; Extended European Search Report for Application No. 22171544.4 dated Sep. 8, 2022.
Anonymous:"TrueairspeedWikipedia", Jun. 28, 2016, XP055451322, RetrievedfromtheInternet: URL:https://en.wikipedia.org/w/index.php?title=True_airspeed&oldid=727293357 [retrievedonFeb. 14, 2018].
European Patent Office; Communication Pursuant to Article 94(3) EPC for Application No. 22171544.4 dated Jun. 17, 2024.
Canadian Intellectual Property Office; Office Action for Application No. 3,156,853 dated Feb. 14, 2024.
Canadian Office Action for application No. 3,156,853 dated Feb. 5, 2025, pp. 1-3.

* cited by examiner

COMPUTATION OF AIRCRAFT AIRSPEED BY INCLUSION OF STATIC AIR TEMPERATURE

CROSS-REFERENCE TO RELATED APPLICATIONS

This application, under 35 U.S.C. § 119, claims the benefit of U.S. Provisional Patent Application Ser. No. 63/183,883 filed on May 4, 2021, and entitled "Computation of Aircraft Airspeed by Inclusion of Statis Air Temperature," the contents of which are hereby incorporated by reference herein.

FIELD OF THE DISCLOSURE

This disclosure is generally related to the field of computing airspeed and, in particular, to the computation of aircraft airspeed by inclusion of static air temperature.

BACKGROUND

Pilots, and automated piloting systems, rely on accurate airspeed indications to ensure safe flights of aircraft. A conventional method of calculating airspeed utilizes a pitot-static system (e.g., a pressure-based system), which calculates airspeed based on the difference between a measured total pressure and a static pressure. Such a method is subject to errors if the measurements are corrupted, for instance by contaminants such as ice or volcanic ash or insect nests that may obstruct the sensors.

One known existing alternate method of computing the airspeed may rely on a computational model of the aircraft, and may include numerous aircraft parameters such as an angle of attack, lift, drag, weight, altitude, aerodynamic coefficients, engine thrust estimate, etc. These parameters may vary constantly through the flight. Such computations may be unique for each aircraft type and the accuracy of these computations may be subject to model simplifications, uncertainties, and errors. Thus, these estimates may be inaccurate in some cases. Further, these estimation methods may be computationally complex and iterative, relying on convergence of the iterative process for accuracy, which may not be guaranteed. These estimation methods may be particularly prone to uncertainty or error in the high subsonic regime where jet aircrafts typically operate.

Another alternate method for determining airspeed may use optical sensors to compute the velocity of remote particles in the atmosphere based on detecting the reflections from a laser light source mounted in the airplane (e.g., light detection and ranging (LIDAR)). Such optical methods rely on expensive sensing devices and light sources. These methods may also be vulnerable to inaccuracies due to some of the same conditions (e.g., volcanic ash) that may affect a pitot-static system, because excessive particles in the air can change the transmission of light through the atmosphere, and the optical projection and sensing windows can be damaged by impact from suspended ash particles.

Another method (referred to as Flush Air Data System (FADS)) may use flush-mounted static ports for measuring pressure distributed around the fuselage. Airspeed may be calculated based on a complex algorithm that utilizes pressure measured at a multiplicity of ports at different locations. One drawback is that the sensors, particularly upward-facing ports, are susceptible to precipitation and contaminants when the airplane is not in service, which may render them impractical for large transport aircraft. Another drawback is that anomalous readings from one or more sensors may be hard to detect and may cause undetected erroneous airspeed. Other disadvantages may exist.

SUMMARY

Disclosed are systems and methods that overcome at least one of the disadvantages of existing airspeed calculation system and methods. In an example, a true air speed of the aircraft may be computed using measurements from a static air temperature probe, which directly measures static (also called outside) air temperature, along with a total air temperature probe that measures a total air temperature. The static air temperature probe may be mounted on the fuselage of airplane, at a location where a computational fluid dynamics analysis may indicate that the air temperature proximate to the fuselage is nearly equal to the static or outside air temperature, while the total air temperature probe may be mounted in a location, such as on a strut that supports it a short distance away from the aircraft fuselage, where it is exposed to approximately free-stream air flow. A Mach number and airspeed may then be calculated using equations governing atmospheric physics. This process may be primarily applicable to the high subsonic flight regime, as opposed to the low-subsonic flight regime, because temperatures may correlate to speed in high subsonic flight. This new method may be significantly simpler to implement than alternate methods of calculating airspeed. The method may also be used to provide a separate source of airspeed quantities that may detect errors in information provided through typical calculation methods.

In an example, a method includes measuring a static air temperature at an aircraft using a static air temperature probe. The method further includes calculating a Mach number associated with the aircraft at a current flight altitude based at least partially on the static air temperature. The method also includes calculating a true air speed of the aircraft based on the Mach number. The method includes displaying an indication of the true air speed for use in operating the aircraft.

In some examples, the method includes measuring a total air temperature at the aircraft using a total air temperature probe, where calculating the Mach number is further based on a difference between the total air temperature and static air temperature. In some examples, the method include calculating the speed of sound at the aircraft at the current flight altitude based on the static air temperature, where calculating the true air speed is further based on the speed of sound at the current flight altitude. In some examples, the method includes measuring a static pressure at the aircraft, calculating an impact pressure based on the Mach number and the static pressure, and calculating a total pressure by adding the impact pressure to the static pressure. In some examples, the method includes calculating an altitude of the aircraft based on the static pressure at the aircraft. In some examples, the method includes calculating a calibrated air speed and displaying an indication of the calibrated air speed for use in operating the aircraft.

In some examples, the static air temperature probe is part of a set of at least two static air temperature probes. The set of at least two static air temperature probes is positioned at a forward body station of the aircraft in the vicinity of other sensors attached to the aircraft, including a total air temperature probe. In some examples, the set of at least two static air temperature probes are positioned at a body station of the aircraft, other than a forward body station, in the vicinity of other sensors attached to the aircraft, including a static pressure sensor. The position of the set of at least two static air temperature probes is determined using a computational fluid dynamics analysis, such that the position provides the static air temperature. Measurements taken by the static air temperature probe may correlate closely to the static air temperature. In some applications, the measurements may need some correction based on measurements from other sensors.

In an example, a system includes a static air temperature probe attached to an aircraft. The system further includes an electronic flight instrument system. The system also includes a processor. The processor is configured to measure a static air temperature at the aircraft using the static air temperature probe. The processor is further configured to calculate a Mach number associated with the aircraft based at least partially on the static air temperature. The processor is also configured to calculate a true air speed of the aircraft based at least partially on the Mach number. The true air speed may also be based on altitude and on the static air temperature. The processor is configured to display an indication of the true air speed using the electronic flight instrument system.

In some examples, the system includes a total air temperature probe attached to the aircraft. The processor is further configured to measuring a total air temperature at the aircraft using a total air temperature probe. Calculating the Mach number is further based on a scaled difference between the total air temperature and static air temperature. In some examples, the processor is further configured to calculate the speed of sound at the aircraft based on the static air temperature, where calculating the true air speed is further based on the speed of sound at the aircraft. In some examples, the processor is configured to measure a static pressure at the aircraft, calculate an impact pressure based on the Mach number and the static pressure, and calculate a total pressure by adding the impact pressure to the static pressure. The processor may also be configured to compare the calculated impact pressure with a measured impact pressure taken from the measured static and total pressures. In some examples, the processor is configured to calculate an altitude of the aircraft based on the static pressure at the aircraft. In some examples, the processor is configured to calculate a calibrated air speed and display an indication of the calibrated air speed using the electronic flight instrument system.

In some examples, the static air temperature probe is positioned on a forward body station of the aircraft. In some examples, the static air temperature probe is positioned on a body station of the aircraft other than a forward body station. In some examples, the static air temperature probe is one of a set of at least two static air temperature probes attached to the aircraft. In some examples, the aircraft is a commercial jet aircraft configured to fly at high subsonic speeds.

In an example, a system includes an aircraft. The system further includes a static air temperature probe configured to measure a static air temperature at the aircraft. The system also includes an electronic flight instrument system configured to display an indication of the true air speed, where the true air speed is calculated at least partially based on the static air temperature. The calculation may also be based on the Mach number.

Figure 1:
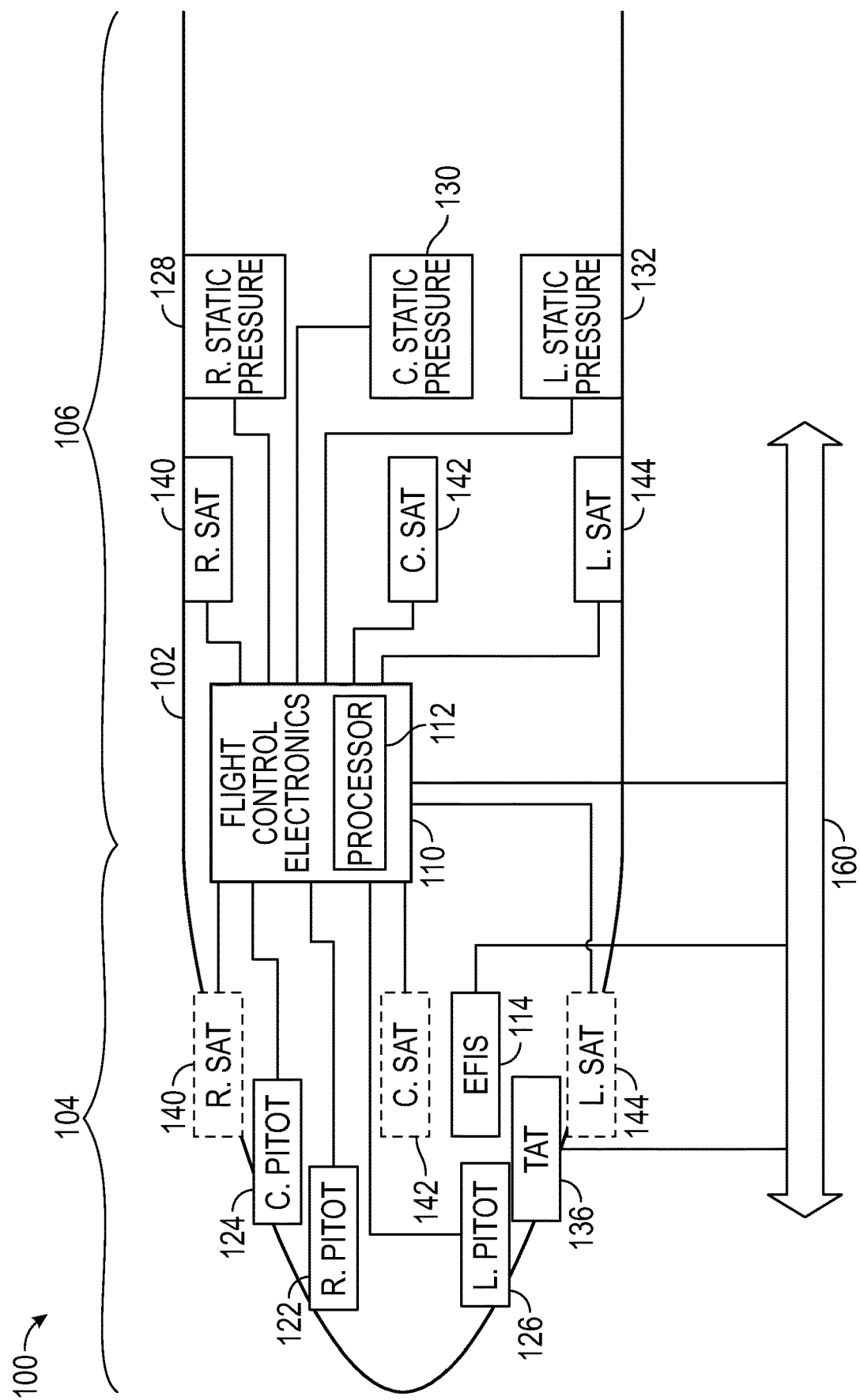
FIG. 1 is a schematic diagram depicting a system for computing aircraft airspeed.

While the disclosure is susceptible to various modifications and alternative forms, specific examples have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, a system 100 for computing aircraft airspeed is depicted. The system may be implemented at an aircraft 102 having a forward body station 104 and another body station 106. In FIG. 1, portions of the system 100 are described as being positioned in the forward body station 104 and other portions are described as being positioned in the other body station 106. However, in practice the actual position of each component may vary. Further, in addition to the system 100, other systems and components for piloting and operating the aircraft 102, which are not depicted in FIG. 1, may also be included. The aircraft 102 may be equipped with flight control electronics 110, which may coordinate operations between systems and may perform calculations and operations as described herein. The flight control electronics 110 may include one or more processors 112.

As used herein, the processor 112 may include a microcontroller, a central processing unit (CPU), a graphical processing unit (GPU), a digital signal processor (DSP), a peripheral interface controller (PIC), another type of microprocessor, and/or combinations thereof. Further, the processor 112 may be implemented as an integrated circuit, a complementary metal-oxide-semiconductor field-effect-transistor (MOSFET) circuit, a very-large-scale-integrated (VLSI) circuit, a field-programmable gate array (FPGA), an application-specific integrated circuit (ASIC), a combinations of logic gate circuitry, another type of digital or analog electrical design component, or combinations thereof. For purposes of this disclosure, the processor 112 may further include sufficient memory to perform the functions described herein. The memory may include memory devices such as random-access memory (RAM), read-only memory (ROM), magnetic disk memory, optical disk memory, flash memory, another type of memory capable of storing data and processor instructions, or the like, or combinations thereof. The processor 112 may be centralized or distributed across multiple processing units. Further, although, FIG. 1 depicts the processor 112 as being local to the aircraft 102, in practice, the processor 112, or portions thereof, may be remotely located.

The system 100 may include an electronic flight instrument system 114, which may provide indications of various flight parameters to a pilot or other user of the system 100. For example, the electronic flight instrument system 114 may be capable of displaying indications of a static air temperature, a total air temperature, a Mach number, a calibrated air speed, a speed of sound, a true air speed, an impact pressure, a static pressure, and an altitude of the aircraft 102, among many other parameters that may be used to pilot the aircraft 102.

A data bus 160 may relay communications between the electronic flight instrument system 114 and the flight control electronics 110. Other systems may also communicate with the flight control electronics 110 via the data bus 160. Although depicted as a single connection, the data bus 160 may include any type of communication infrastructure capable of maintaining electronic communication between components of the aircraft 102, such as the electronic flight instrument system 114, and the flight control electronics 110.

The system 100 may include a right pitot 122, a center pitot 124, and a left pitot 126. The pitots 122, 124, 126 may be positioned on the forward body station 104 and may be used to measure air pressure at selected locations of the aircraft 102. The actual locations of the pitots 122, 124, 126 along a cross section of the fuselage of the aircraft 102 may vary and may differ from FIG. 1. While FIG. 1 depicts three pitots 122, 124, 126, in practice more or fewer than three pitots may be included.

The pitots 122, 124, 126 may be coupled to the flight control electronics 110. Although not depicted for clarity reasons, additional mechanical and electrical, or electronic, devices may be included to convert measurements taken at the pitots 122, 124, 126 into a readable format for used at the flight control electronics 110. Measurements taken from the right pitot 122, the center pitot 124, the left pitot 126, or a combination thereof may be used to determine a total pressure associated with the aircraft 102. The total pressure may be a stagnation pressure measured within the pitots 122, 124, 126 such that the air has no or negligible velocity at a point of measurement.

The system 100 may include a right static pressure sensor 128, a center static pressure sensor 130, and a left static pressure sensor 132. The static pressure sensors 128, 130, 132 may be positioned on the other body station 106 and may be used to measure a static pressure at the aircraft 102. While FIG. 1 depicts three static pressure sensors 128, 130, 132, in practice more or fewer than three static pressure sensors may be included.

The static pressure sensors 128, 130, 132 may be coupled to the flight control electronics 110. As with the pitots 122, 124, 126, additional mechanical and electrical devices may be included to convert measurements into a readable format for used at the flight control electronics 110. Measurements taken from the right static pressure sensor 128, the center static pressure sensor 130, and the left static pressure sensor 132, or a combination thereof may be used to determine a static pressure associated with the aircraft 102. The static pressure may equal a difference between the total pressure measured by the pitots 122, 124, 126 and an impact pressure associated with the aircraft 102. Thus, by measuring a total pressure and a static pressure, the impact pressure is also measured and can be determined.

The system 100 may include a total air temperature probe 136 positioned on the forward body station 104. The total air temperature probe 136 may measure a total air temperature which may include a temperature component associated with movement of the aircraft 102 through air. Measurements taken at the total air temperature probe 136 may be transmitted to the flight control electronics 110 via the data bus 160.

Currently, the impact pressure and the static pressure may be used to determine a Mach number associated with the aircraft 102. The total air temperature may then be used in conjunction with the Mach number to calculate a static air temperature. Based on the static air temperature and the Mach number, a corresponding true air speed may be determined. However, this process is subject to potential error, particularly if the pitots 122, 124, 126 or if one of the static pressure sensors 128, 130, 132 becomes clogged (e.g., by ice, dust, or ash) or becomes otherwise inoperable.

The system 100 may include a right static air temperature probe 140, a center static air temperature probe 142, and a left static air temperature probe 144. The static air temperature probes 140, 142, 144 may measure a static air temperature at the aircraft. The static air temperature may equal the total air temperature minus the temperature component associated with movement of the aircraft 102 through the air. Although FIG. 1 depicts three static air temperature probes 140, 142, 144, in practice more or fewer than three static air temperature probes may be included. For example, in some cases a single static air temperature probe may be sufficient.

The static air temperature probes 140, 142, 144 may be positioned along the other body station 106 so as to reduce the temperature effects of passing through the air on temperature measurements. The exact position of the static air temperature probes 140, 142, 144 may be computationally determined based on a type and shape of the aircraft 102. For example, the position of the static air temperature probes 140, 142, 144 may be determined using a computational fluid dynamics analysis, such that the position provides the static air temperature without interference from air flow proximate to the aircraft 102. In an example, at least the center static air temperature probe 142 may be positioned on an underside of a fuselage of the aircraft 102.

Optionally, the static air temperature probes 140, 142, 144 may be positioned on the forward body station 104 as depicted by the dashed-lined boxes in FIG. 1. Although FIG. 1 depicts the static air temperature probes 140, 142, 144 as connected directly to the flight control electronics 110, in some examples, measurements taken at the static air temperature probes 140, 142, 144 may be transmitted to the flight control electronics 110 via the data bus 160.

Figure 2:
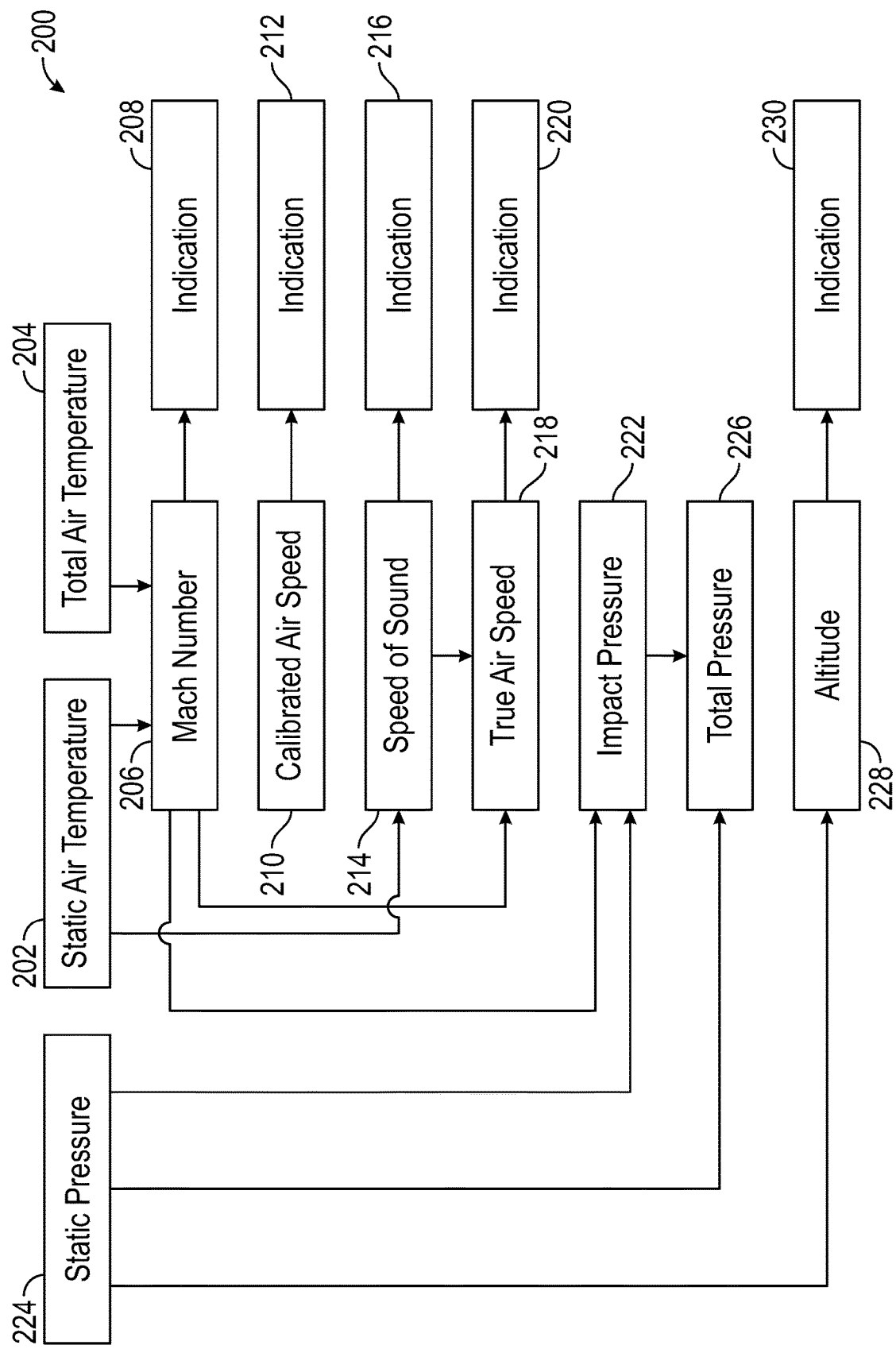
FIG. 2 is a block diagram depicting data associated with computing aircraft airspeed.

FIG. 2 depicts data 200 associated with computing aircraft airspeed and other parameters. The data 200 may be measured and/or calculated by the system 100 of FIG. 1 as described herein. Initially, a static pressure 224 may be measured by at least one of the static air pressure sensors 128, 130, 132, a static air temperature 202 may be measured by at least one of the static air temperature probes 140, 142, 144 and a total air temperature 204 may be measured by the total air temperature probe 136.

A Mach number 206 associated with the aircraft 102 may be calculated based on the static air temperature 202 and the total air temperature 204. For example, the Mach number may be determined by the formula:

$$M = \sqrt{\frac{5}{k}\left(\frac{Tt - Ts}{Ts}\right)}$$

where M is the Mach number 206, Tt is the total air temperature 204, Ts is the static air temperature 202, and k is a recovery factor and is dependent on the sensor characteristics and system installation. In the above equation, the units of Tt and Ts are degrees Kelvin. The Mach number 206 may be specific to the environment surrounding the aircraft 102. The speed of sound is dependent on a surrounding air temperature, which is affected by parameters such as altitude and atmospheric air pressure. An indication 208 of the Mach number 206 may be displayed to a pilot, or other user, using the electronic flight instrument system 114.

A calibrated air speed 210 may also be calculated and an indication 212 of the calibrated air speed 210 may be displayed to the pilot, or other user, using the electronic flight instrument system 114.

At high subsonic speeds, a speed of sound 214 (which depends on temperature) may be calculated using the static air temperature 202. For example, the speed of sound 214 may be determined by the formula:

$$a = a_0 * \sqrt{\frac{Ts}{T0}}$$

where a is the speed of sound 214, $a_0$ is the speed of sound at standard atmospheric pressure at sea level ($a_0$=661.48 knots), Ts is the static air temperature 202, and T0 is a standard day temperature at sea level (T0=273.15+15° K). In the above equation, the units of Ts and T0 are degrees Kelvin. An indication 216 of the speed of sound 210 may be displayed to the pilot, or other user, using the electronic flight instrument system 114.

Based on the Mach number 206 and the speed of sound 214, a true air speed 218 may be calculated. For example, the true air speed 218 may be determined by the formula:

$$TAS = M*a$$

where TAS is the true air speed 218, M is the Mach number 206, and a is the speed of sound 214. In the above equation, the units of a and TAS are knots. An indication 220 of the true air speed 218 may be displayed to the pilot, or other user, using the electronic flight instrument system 114.

The Mach number 206, which is based on the static air temperature 202, may also be used, along with the static pressure 224, to calculate an impact pressure 222 and a total pressure 226. For example, a ratio of impact pressure to static pressure may be calculated using the formula:

$$\frac{qc}{ps} = [1 + 0.2M^2]^{3.5} - 1.0$$

where qc is the impact pressure 222, ps is the static pressure, and M is the Mach number 206. In the above equation, the units of ps and qc are mBar. Using the ratio and the measured static pressure 224, the impact pressure 222 may be calculated. The total pressure 226 may be determined by the formula:

$$p_T = p_s + q_c$$

where $p_T$ is the total pressure 226, $p_s$ is the measured static pressure 224, and $q_c$ is the impact pressure 222. In the above equation, the units of $p_T$ are mBar. In some cases, the total pressure 226 may be used to verify a measured total pressure to ensure correct functioning of sensors at the aircraft 102.

An altitude 228 of the aircraft 102 may be calculated using the formulas:

$$H = 145442.156 * \left[1 - \left(\frac{ps}{p0}\right)^{K1}\right] \quad \text{for } ps > 226.32 \, mBar$$

$$H = 36,089.2388 + K2 * \ln\left(\frac{226.32}{ps}\right) \quad \text{for } ps < 226.32 \, mBar$$

where H is the pressure altitude, ps is the static pressure, p0 is the standard atmospheric pressure at sea-level, and K1 and K2 are constants. In the above equation, the units of H are feet and the units of ps and p0 are mBar. An indication 230 of the altitude 228 may be displayed to the pilot, or other user, using the electronic flight instrument system 114.

A benefit of using the static air temperature 202 as it is measured, rather than being calculated, may be that the data 200, including the true air speed 218, may be determined without reliance on pressure sensors, which may be susceptible to inaccuracies if ice, ash, or another in air substance interferes with them. Other benefits may exist.

Figure 3:
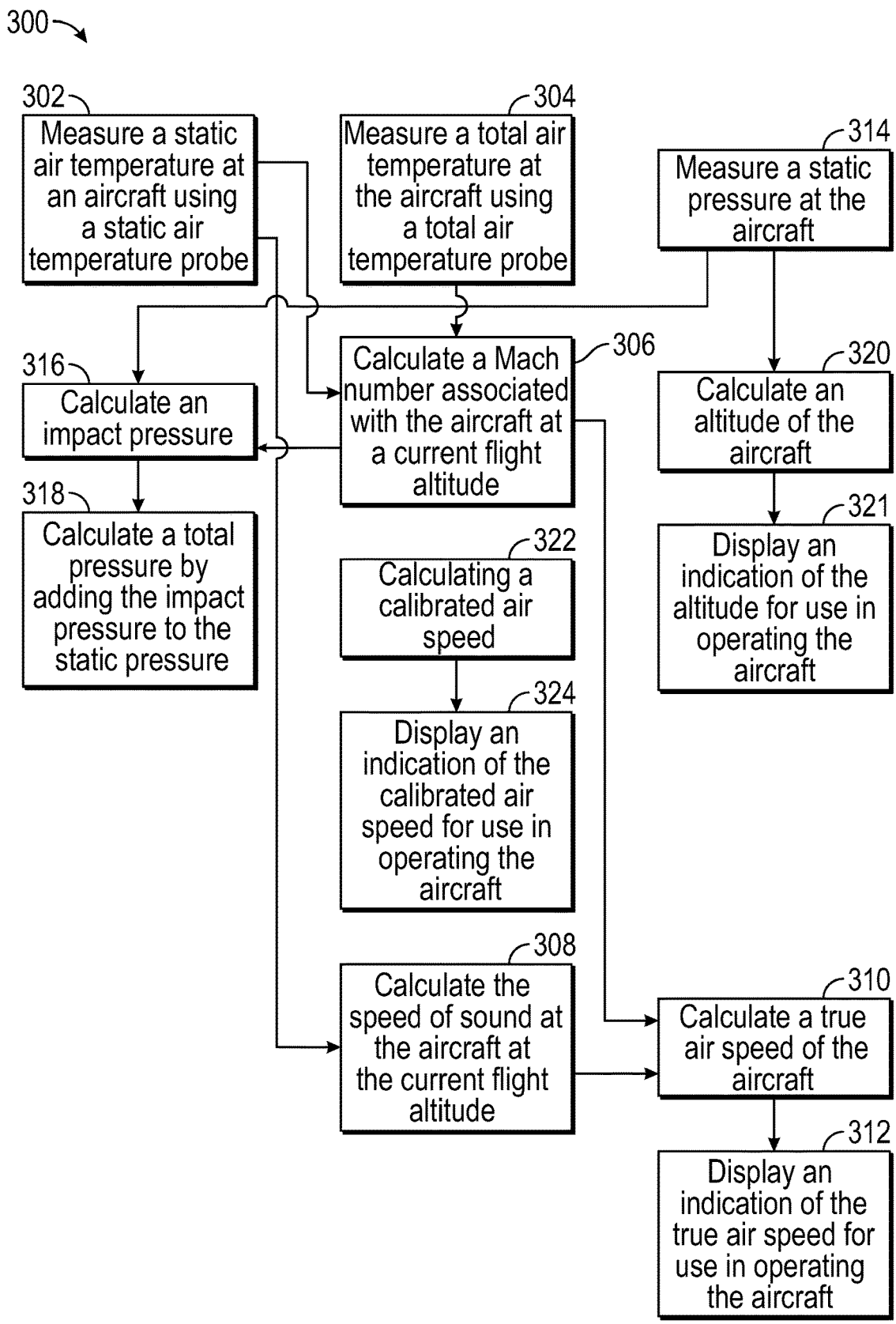
FIG. 3 is a block diagram depicting a method for computing aircraft airspeed.

Referring to FIG. 3, a method 300 for computing aircraft air speed is depicted. The method 300 may include measuring a static air temperature at an aircraft using a static air temperature probe, at 302. For example, the static air temperature 202 may be measured by at least one of right static air temperature probe 140, the center static air temperature probe 142, and the left static air temperature probe 144.

The method 300 may further include measuring a total air temperature at the aircraft using a total air temperature probe, at 304. For example, the total air temperature 204 may be measured using the total air temperature probe 136.

The method 300 may also include calculating a Mach number associated with the aircraft at a current flight altitude, at 306. For example, the Mach number 206 may be calculated based on the static air temperature 202 and the total air temperature 204.

The method 300 may include calculating the speed of sound at the aircraft at the current flight altitude, at 308. For example, the speed of sound 214 may be calculated based on the static air temperature 202.

The method 300 may further include calculating a true air speed of the aircraft, at 310. For example, the true air speed 218 may be calculated based on the speed of sound 214 and the Mach number 206.

The method 300 may also include displaying an indication of the true air speed for use in operating the aircraft, at 312. For example, the indication 220 of the true air speed 218 may be displayed at the electronic flight instrument system 114.

The method 300 may include measuring a static pressure at the aircraft, at 314. For example, the measured static pressure 224 may be measured using at least one of the right static pressure sensor 128, the center static pressure sensor 130, and the left static pressure sensor 132.

The method 300 may further include calculating an impact pressure, at 316. For example, the impact pressure 222 may be calculated based on the Mach number 206 and the measured static pressure 224.

The method 300 may also include calculating a total pressure by adding the impact pressure to the static pressure, at 318. For example, the total pressure 226 may be calculated by adding the impact pressure 222 and the measured static pressure 224.

The method 300 may include calculating an altitude of the aircraft, at 320. For example, the altitude 228 may be calculated based on the measured static pressure 224.

The method 300 may further include displaying an indication of the altitude for use in operating the aircraft, at 321. For example, the indication 230 of the altitude 228 may be displayed using the electronic fight instrument system 114.

The method 300 may include calculating a calibrated air speed, at 322. For example, the calibrated air speed 210 may be calculated.

The method 300 may further include displaying an indication of the calibrated air speed for use in operating the aircraft, at 324. For example, the indication 212 of the calibrated air speed 210 may be displayed at the electronic flight instrument system 114.

A benefit of the method 300 is that by basing the calculations of a true air speed, speed of sound, etc., on a measured static air temperature, potential inaccuracies associated with pressure sensors and pitots may be avoided. Further, calculations based on the static air temperature may be simplified as compared to other methods of calculating true air speed.

Several additional benefits of the described system and method exist including: (1) measurements of static temperature may be taken that are independent of pressure measurements taken at various pitots of an aircraft; (2) measurements of static temperature may be used as an additional computation of a true air speed for comparison to conventional true air speed calculations that rely on air pressure sensors; (3) measurements of the static air temperature may be used to calculate a true air speed in cases where one or more pressure pitots fail or become unreliable (e.g., due to precipitation, clogging, and/or debris); and (4) measurements of static air temperature may prevent potential crew confusion in cases of pitot failure and increase air safety. Other advantages may exist.

Although various examples have been shown and described, the present disclosure is not so limited and will be understood to include all such modifications and variations as would be apparent to one skilled in the art.

What is claimed is:

1. A method comprising:
receiving, at flight control electronics of an aircraft, a static air temperature from a static air temperature probe, wherein the static air temperature probe is mounted on a fuselage of the aircraft at a location where a computational fluid dynamics analysis indicates that an air temperature proximate to the fuselage is substantially equal to an outside air temperature;
calculating, at the flight control electronics, a Mach number associated with the aircraft at a current flight altitude based on the static air temperature;
calculating, at the flight control electronics, a true air speed of the aircraft based on the Mach number; and
operating the aircraft via the flight control electronics using the true air speed.

2. The method of claim 1, further comprising measuring a total air temperature at the aircraft using a total air temperature probe, wherein calculating the Mach number is further based on a difference between the total air temperature and the static air temperature.

3. The method of claim 1, further comprising calculating a speed of sound at the aircraft at the current flight altitude based on the static air temperature, wherein calculating the true air speed is further based on the speed of sound at the current flight altitude.

4. The method of claim 1, further comprising:
measuring a static pressure at the aircraft;
calculating an impact pressure based on the Mach number and the static pressure; and
calculating a total pressure by adding the impact pressure to the static pressure.

5. The method of claim 4, further comprising:
calculating an altitude of the aircraft based on the static pressure at the aircraft.

6. The method of claim 1, further comprising:
calculating a calibrated air speed; and
displaying an indication of the calibrated air speed for use in operating the aircraft.

7. The method of claim 1, wherein the static air temperature probe is part of a set of at least two static air temperature probes, wherein the set of at least two static air temperature probes are positioned at a forward body station of the aircraft in a vicinity of other sensors attached to the aircraft, and wherein the other sensors include a total air temperature probe.

8. The method of claim 1, further comprising, prior to measuring the static air temperature, performing the computational fluid dynamics analysis.

9. A system comprising:
a static air temperature probe attached to an aircraft, wherein the static air temperature probe is mounted on a fuselage of the aircraft at a location where a computational fluid dynamics analysis indicates that an air temperature proximate to the fuselage is substantially equal to an outside air temperature;
flight control electronics; and
a processor configured to:
measure a static air temperature at the aircraft using the static air temperature probe;
calculate a Mach number associated with the aircraft based at least partially on the static air temperature;
calculate a true air speed of the aircraft based at least partially on the Mach number; and
operate, via the flight control electronics, the aircraft using the true air speed.

10. The system of claim 9, further comprising a total air temperature probe attached to the aircraft, wherein the processor is further configured to measure a total air temperature at the aircraft using the total air temperature probe, and wherein calculating the Mach number is further based on a scaled difference between the total air temperature and the static air temperature.

11. The system of claim 9, wherein the processor is further configured to calculate a speed of sound at the aircraft based on the static air temperature, and wherein calculation of the true air speed is further based on the speed of sound at the aircraft.

12. The system of claim 9, wherein the processor is further configured to:
measure a static pressure at the aircraft;
calculate an impact pressure based on the Mach number and the static pressure; and
calculate a total pressure by adding the impact pressure to the static pressure.

13. The system of claim 12, wherein the processor is further configured to calculate an altitude of the aircraft based on the static pressure at the aircraft.

14. The system of claim 9, wherein the processor is further configured to:
calculate a calibrated air speed; and
display an indication of the calibrated air speed using an electronic flight instrument system.

15. The system of claim 9, further comprising a total air temperature probe that is coupled to a strut that is coupled to the aircraft.

16. The system of claim 9, further comprising a second static air temperature probe and a third static air temperature probe positioned at a forward body station of the aircraft, wherein the static air temperature is further based on outputs of the second static air temperature probe and the third static air temperature probe.

17. The system of claim 9, wherein the Mach number is further calculated based on a total air temperature as measured by a total air temperature probe.

18. The system of claim 9, wherein the aircraft is a jet aircraft configured to fly at high subsonic speeds.

19. A system comprising:
- an aircraft;
- a static air temperature probe configured to measure a static air temperature at the aircraft, wherein the static air temperature probe is mounted on a fuselage of the aircraft at a location where a computational fluid dynamics analysis indicates that an air temperature proximate to the fuselage is substantially equal to an outside air temperature;
- one or more processors configured to calculate a true air speed based at least in part on the static air temperature; and
- flight control electronics configured to operate the aircraft using the true air speed.

20. The system of claim 19, wherein the static air temperature probe is part of a set of at least two static air temperature probes, wherein the set of at least two static air temperature probes are positioned at a body station of the aircraft, other than a forward body station, in a vicinity of other sensors attached to the aircraft, and wherein the other sensors include a static pressure sensor.

* * * * *